United States Patent
Hiraiwa (10) Patent No.: US 6,343,106 B1
(45) Date of Patent: *Jan. 29, 2002

(54) BOILING WATER REACTOR AND OPERATION THEREOF

(75) Inventor: Kouji Hiraiwa, Kanagawa-ken (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,983

(22) Filed: Aug. 19, 1999

(30) Foreign Application Priority Data

Aug. 27, 1998 (JP) .......... 10-241601
Jun. 28, 1999 (JP) .......... 11-181241

(51) Int. Cl.$^7$ .......... G21C 7/00
(52) U.S. Cl. .......... 376/278; 376/277; 376/304; 376/370
(58) Field of Search .......... 376/278, 277, 376/370, 304

(56) References Cited

U.S. PATENT DOCUMENTS

| | | | | |
|---|---|---|---|---|
| 2,998,367 A | * | 8/1961 | Untermeyer | 204/193.2 |
| 3,766,007 A | * | 10/1973 | Rolstad et al. | 176/56 |
| 4,587,089 A | * | 5/1986 | Takeda et al. | 376/428 |
| 4,755,352 A | * | 7/1988 | Glen et al. | 376/404 |
| 4,877,574 A | * | 10/1989 | Suzuki et al. | 376/216 |
| 4,999,153 A | * | 3/1991 | Johansson et al. | 376/443 |
| 5,009,840 A | | 4/1991 | Ueda et al. | 376/435 |
| 5,017,332 A | * | 5/1991 | Dix et al. | 376/370 |
| 5,112,570 A | * | 5/1992 | Dix et al. | 376/370 |
| 5,120,493 A | * | 6/1992 | Marquino et al. | 376/278 |
| 5,145,635 A | * | 9/1992 | Ishii et al. | 376/173 |
| 5,154,880 A | * | 10/1992 | Oosterkamp | 376/370 |
| 5,225,149 A | * | 7/1993 | Banda | 376/255 |
| 5,349,619 A | | 9/1994 | Mochida et al. | 376/444 |
| 5,367,547 A | | 11/1994 | Hida et al. | 376/435 |
| 5,392,326 A | | 2/1995 | Narabayashi et al. | 376/371 |
| 5,416,813 A | * | 5/1995 | Hiraiwa et al. | 376/419 |
| 5,442,668 A | * | 8/1995 | Todreas et al. | 376/367 |
| 5,812,621 A | * | 9/1998 | Takeda et al. | 376/171 |
| 5,844,957 A | * | 12/1998 | Johannesson et al. | 376/370 |

FOREIGN PATENT DOCUMENTS

| | | | | |
|---|---|---|---|---|
| DE | 19940081 A1 | * | 8/1999 | ....... G21C/7/02 |
| JP | 60-108796 | | 6/1985 | |
| JP | 61-134691 | | 6/1986 | |
| JP | 63-98591 | | 4/1988 | |
| JP | 1-297599 | | 11/1989 | |
| JP | 3-137598 | | 6/1991 | |
| JP | 5-223973 | | 9/1993 | |
| JP | 6-118188 | | 4/1994 | |
| JP | 7-301688 | | 11/1995 | |
| JP | 9-292482 | | 11/1995 | |
| JP | 8-21890 | * | 1/1996 | ....... G21C/5/20 |
| JP | 10-170674 | | 6/1998 | |

* cited by examiner

Primary Examiner—Charles T. Jordan
Assistant Examiner—John Richardson
(74) Attorney, Agent, or Firm—Foley & Lardner (57) ABSTRACT

In a nuclear reactor, in-core stability is improved, power density is increased, and an economical natural-circulation reactor (or partial forced-circulation reactor) is achieved. The reactor core has a void reactivity coefficient between −0.07 and −0.03% Δk/k/% void fraction. This void reactivity coefficient range is achieved by, for example, the design of the by-pass portion and channel box, the enrichment distribution along the axial direction, the provision of blanket areas, and/or the arrangement of water rods and fuel rods within a channel box.

16 Claims, 10 Drawing Sheets

BOILING WATER REACTOR AND OPERATION THEREOF

BACKGROUND OF THE INVENTION

1. Field of the Invention

This invention relates to nuclear reactors which circulate cooling water by natural circulation power, and to nuclear reactors which circulate at most 30% of the cooling water by forced-circulation power.

This invention improves critical power performance at the time of a pressure rise transient (rather than critical power performance at the time of a water-supply temperature transient) by making a dynamic void coefficient greater than a predetermined value.

2. Description of the Related Art

Figure 13:
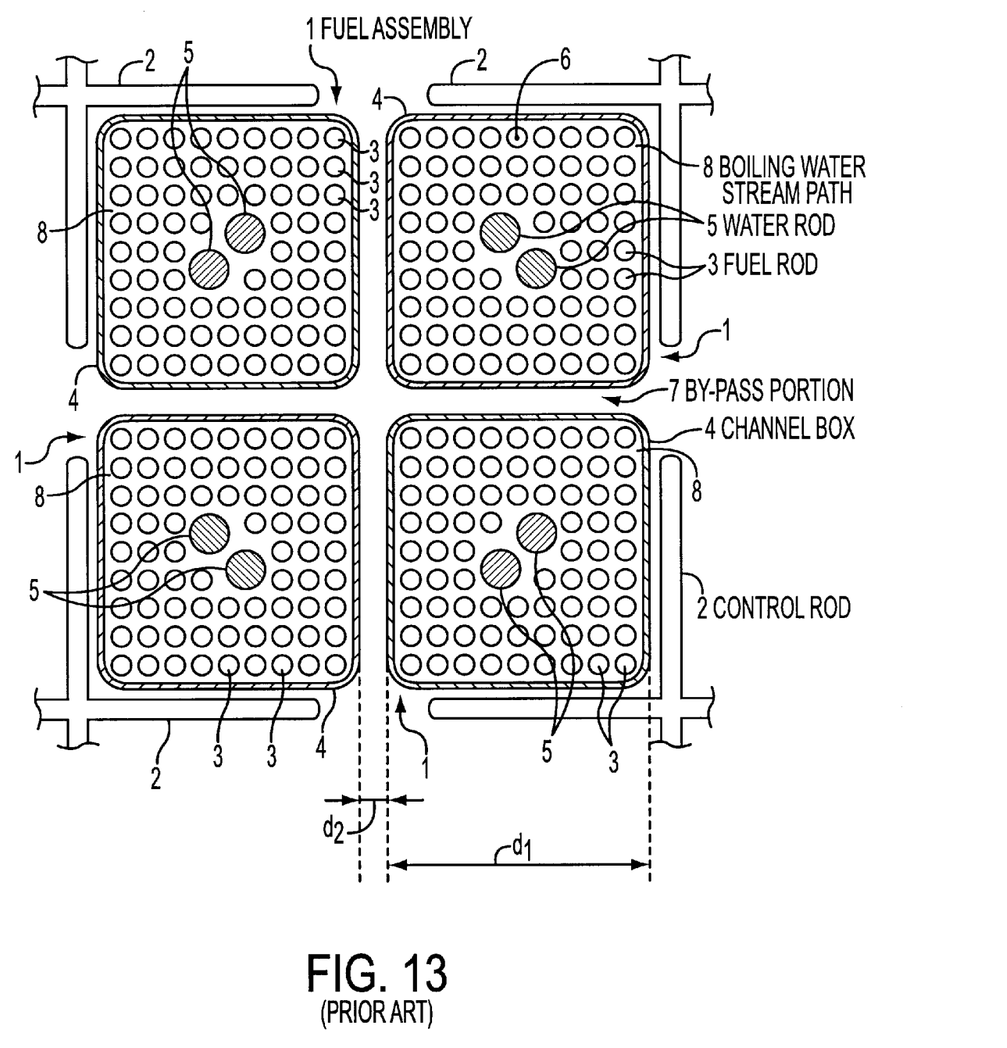
FIG. 13 is a sectional view showing a central part inside a conventional nuclear reactor.

A conventional fuel assembly and a conventional reactor core are explained with reference to FIG. 13 and FIG. 14. FIG. 13 is a sectional view showing a principal part inside a conventional reactor core, and shows the arrangement of a fuel assembly and a control rod. In a fuel assembly 1, two water-rods 5 where coolant (i.e. non-boiling water) flow inside are arranged and, for example, two or more fuel rods 3 containing nuclear fuel material 6 (like a cylinder pellet) are enclosed as shown in this figure. A channel box 4 surrounds the fuel assembly 1, and a boiling water stream path 8 is formed in the channel box 4.

The fuel assembly 1 and a control rod 2 are arranged regularly, in the reactor core 14. A control rod 2, for example, is arranged four per fuel assembly 1.

The gap between a fuel assembly and an adjacent assembly serves as a by-pass portion 7 in which the coolant (i.e. non-boiling water) exists. The cooling water in the by-pass portion 7 does not boil, even if there is heating by neutron radiation, and the like.

The parameters d1 and d2 in FIG. 13 represent the width of a channel box 4, and a width of the by-pass portion 7, respectively. The width d2 of the conventional by-pass portion 7 is less than 10% of the width d1 of the channel box 4. In the conventional fuel assembly, the water rod(s) 5 is arranged at the central section of the fuel assembly 1.

The following method is adopted in regard to the enrichment distribution of the fuel. The enrichment distribution is arranged in the vertical direction. The enrichment of the upper part is set 0.2 wt % (or less) larger than that of the lower part. There may be installed a natural uranium blanket of a low reactivity at a vertical edges of the fuel. In this case, the upper and lower blankets are the same length, or the upper blanket is longer than the lower blanket.

Figure 14:
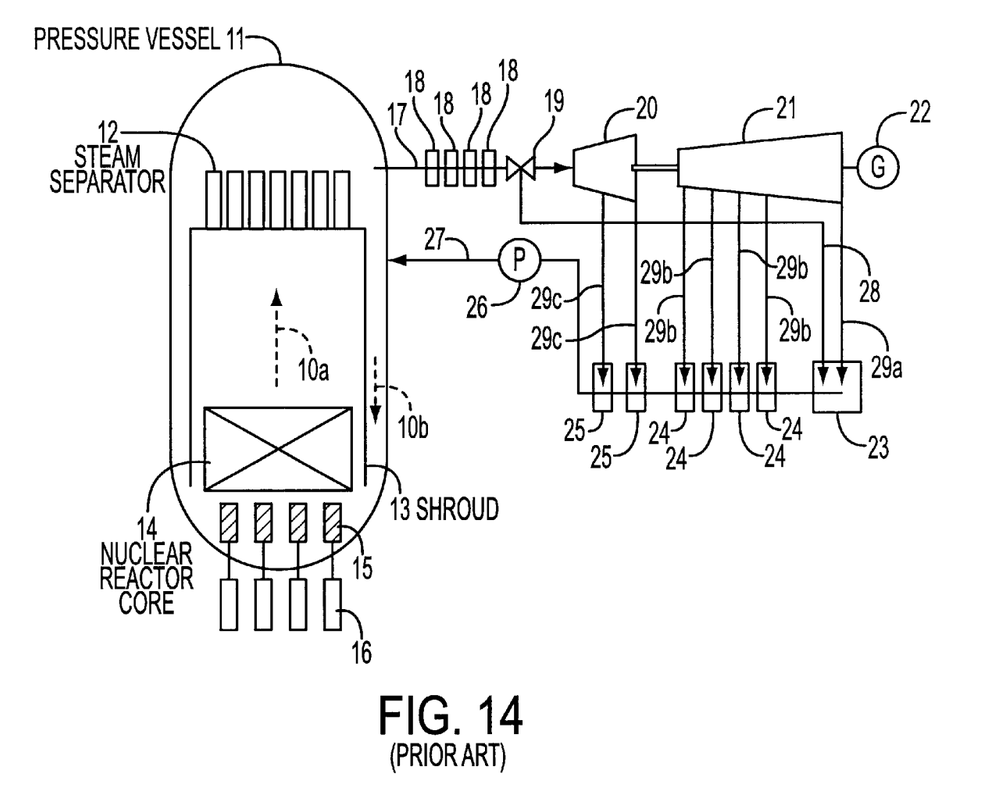
FIG. 14 shows an outline of a conventional boiling water reactor.

FIG. 14 is a system figure showing the outline of the conventional boiling water reactor. As shown in this figure, the nuclear reactor core 14 is built in the pressure vessel 11 of the boiling water reactor. The upper part of the nuclear reactor core 14 is surrounded with a shroud 13. A steam separator 12 to separate steam and saturated water is installed in the upper part of the shroud 13. By the steam separator 12, the steam is drawn up and the saturated water is led to the outside of the shroud 13.

Underneath the nuclear reactor core 14, a plurality of control rods 15 are installed. The control rods 15 are driven in and out with control rod drive 16 installed in the lower part of the pressure vessel 11.

Usually, the internal pressure of the pressure vessel 11 during operating power is set as 70 times atmospheric pressure, for example. The shroud 13 divides coolant flow to the upper part of the pressure vessel from the nuclear reactor core 14 (the arrow with attached symbol 10a in the figure) and flow exterior of the nuclear reactor core 14, i.e., the coolant flow to the lower portion of the pressure vessel produced near the inner wall of the pressure vessel 11 (the arrow with attached symbol 10b in the figure).

Based on differences in the mechanisms which cause the flow of such coolant, there are two kinds of boiling water reactors, that is, a natural-circulation reactor and a forced-circulation reactor. In the natural-circulation reactor, cooling water is driven by natural-circulation power by the saturated water outside of the shroud 13. Thus, the saturated water is led inside to the lower part of the nuclear reactor core 14.

In contrast, the saturated water circulates in a forced-circulation water reactor by a drive from a power apparatus installed outside of the shroud 13. As the power apparatus, there are employed a re-circulating water pump, an internal pump, etc.

A main steam pipe 17 is connected to the pressure vessel 11, and the steam generated by the nuclear reactor is led to a high-pressure turbine 20. A plurality of relief safety valves 18 are set in the main steam pipe 17. When an abnormal pressure rise happens, a relief safety valve 18 is opened and the internal pressure of the pressure vessel 11 is reduced.

A turbine governor valve 19 is set between the high-pressure turbine 20 and the relief safety valves 18 to adjust the amount of steam introduced to the high-pressure turbine 20.

When a so-called pressure rise transient phenomena occurs, such as during a loss of a generator load, in order to prevent the rotational frequency of the turbine from going too high, the turbine governor valve 19 is closed. When the turbine governor valve 19 is closed, the main steam is usually led to a condenser 23 through a by-pass line 28.

A low-pressure turbine 21 is installed downstream of the high-pressure turbine 20, and rotation of the turbines is converted into current by a generator 22 installed downstream of the low-pressure turbine 21. The steam working in the turbine passes through a steam extraction line 29a from the low-pressure turbine 21, is led to the condenser 23, and is liquefied.

Through a feed pipe 27 and a feed pump 26, the cooling water (i.e. condensation) made by the liquefying is returned to the pressure vessel 11, and circulates through it. In the feed pipe 27, a low-pressure feed water heater 24 and a high-pressure feed water heater 25 are provided. These feed water heater 24 and 25 heat the condensation to suitable water-supply temperature conditions. Feed water heater 24 and 25 operate by taking the steam extraction from each stage as a heat source to heat the coolant water (i.e. condensation) to the appropriate temperature condition. That is, heating of the condensation is performed by the steam extraction from the low-pressure turbine 21 and the high-pressure turbine 20 through steam extraction lines 29b and 29c, respectively, in the low-pressure feed water heater 24 and the high-pressure feed water heater 25. The cooling water temperature of the outlet of the high-pressure feed water heater 25 is about 70 subcool temperature.

The boiling water reactor ensures a stability margin while operating under the following circumstances, by considering beforehand the worst conditions, such as a change in (ΔMCPR) of the minimum critical power ratio (MCPR):

1) the internal pressure of the pressure vessel 11 experiences an abnormal rise;
2) an unusual transient change during operating power occurs in the form of a water supply temperature change outside of the normal range.

MCPR represents the minimum value of the ratio between fuel assembly power (critical power) expected when the boiling transition begins to happen and actual output. When the boiling transition begins to occur, since a liquid layer covering the fuel rod surface will be lost, the cooling state of the fuel rod surface will get worse, and the fuel temperature will rise.

Pressure rise transients occur due to, for example, loss of a load, and water-supply temperature transients occur due to improper operation of a temperature control unit and the like.

In the forced-circulation water reactor, although a flow rate transient due to failure of forced-circulation equipment is assumed, such a failure does not exist in a natural-circulation water reactor.

In connection with the pressure rise transient, the design assumes introduction of the steam to the by-pass line is successful. Generally, since the phenomena at failure is worst case, a stability margin is secured by basing the design on these failure conditions.

In the case of the pressure rise transient of a forced-circulation water reactor, shut down of recirculation is performed at least in part, the power of the nuclear reactor is controlled, and as a result ΔMCPR is kept small. For example, the method of stopping ("shut down") one internal pump (or several sets) may be adopted at the time of a pressure rise transient in a forced-circulation water reactor in which ten internal pumps are installed.

However, in a natural-circulation water reactor, this type of shutdown (by controlling pumps) cannot be accomplished when an abnormal pressure rise transient during operating power occurs, compared with the forced-circulation water reactor mentioned above.

Therefore, in natural-circulation reactors, there is the characteristic that ΔMCPR during a pressure rise transient becomes larger than in the forced-circulation water reactor. Moreover, compared with the forced-circulation water reactor, it is difficult to stop the circulating flow rate of the coolant in a natural-circulation nuclear reactor. If a circulating flow rate equivalent to a forced-circulation water reactor is provided, a big head difference is needed. Therefore, the height of the pressure vessel will need to be increased as compared to the forced-circulation water reactor. When the height of the pressure vessel of the natural-circulation water reactor is made to be about the same as the forced-circulation water reactor average, the following problems will arise.

Since the coolant circulating flow rate is decreased as compared with the forced-circulation water reactor, the average void fraction of the reactor core becomes larger. The dynamic void coefficient also increases, compared with the dynamic void coefficient of a forced-circulation water reactor.

Therefore, negative reactivity feedback at the time of a pressure rise transient does not function effectively, and ΔMCPR becomes larger after all.

In a nuclear reactor, that permits boiling water in the reactor core, the amount of steam bubbles in the reactor core changes with a change of thermal power, pressure, coolant flow, water-supply temperature, and the like. The void coefficient (also called void reactivity coefficient) represents the ratio of change of reactivity accompanied by a change of the amount of steam bubbles in the reactor core, and is an important factor in the safety and the stability of the nuclear reactor.

Thus, a conventional natural-circulation nuclear reactor has the characteristic that ΔMCPR during a pressure rise transient tends to become large, as compared to the forced-circulation water reactor. Therefore, the stability margin needs to be increased.

In the conventional natural-circulation water reactor, the power density is limited to provide adequate core stability. In other words, if pressure rise transient properties and in-core stability are controlled, a smaller reactor core power density, compared with the forced-circulation water reactor, results.

This makes a natural-circulation reactor less efficient and more costly than a forced-circulation reactor.

SUMMARY OF THE INVENTION

The invention is made in order to solve the problems discussed above.

The invention provides an acceptable void coefficient under various conditions and at the same time controls the increase in volume. In-core stability is improved, power density is increased, and an economical natural-circulation reactor (or partial forced-circulation reactor) is achieved.

The invention provides a reactor core, cooled primarily by natural-circulation, with a void reactivity coefficient between −0.07 and −0.03% Δk/k/% void fraction. This void reactivity coefficient range is achieved by, for example, the design of the by-pass portion and channel box, the enrichment distribution along the axial direction, the provision of blanket areas, and/or the arrangement of water rods and fuel-rods-within a channel box.

DETAILED DESCRIPTION OF PREFERRED EMBODIMENTS

The boiling water reactor of a first embodiment according to this invention is hereafter explained with reference to FIG. 1.

Figure 1:
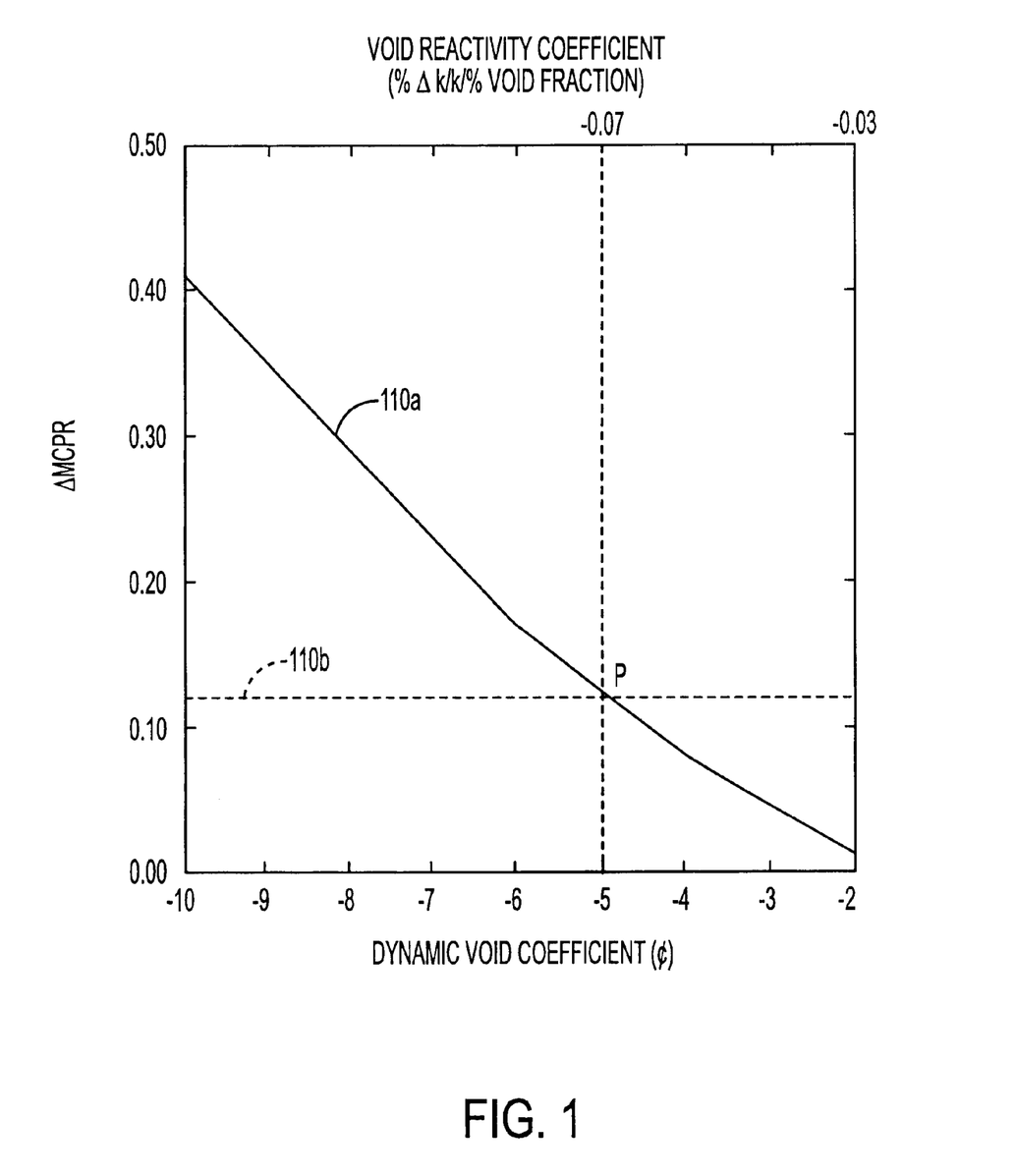
FIG. 1 shows correlation of ΔMCPR during transients of the boiling water reactor of a first embodiment according to this invention.

FIG. 1 is a graph showing a relation between ΔMCPR and a dynamic void coefficient, during a pressure rise transient and a water-supply transient, which are abnormal transient changes during operating power in a natural-circulation water reactor.

During operating power, an average void fraction of 40% is assumed here. Full-capacity of a by-pass is assumed for the pressure rise transient. That is, when the full-capacity of the by-pass is employed and a turbine governor valve carries out rapid closing, rapid opening of a turbine by-pass valve is achieved. About 100% of main steam flow is bypassed and processed to a condenser. The full capacity which is -bypassed is equal to about 100% of the main steam flow.

The solid line with attached symbol 110a of the figure shows ΔMCPR during the pressure rise transient. Moreover, the dashed line with attached symbol 110b shows ΔMCPR during a water-supply temperature reduction transition (due to, for example, improper operation of water-supply temperature control equipment). Point P in the FIGURE shows the point that ΔMCPR of both transients become the same value. The dynamic void coefficient at this time is about "−5¢". Here, "¢" is a unit of reactivity.

As shown in FIG. 1, in the reactor core where the dynamic void coefficient is small (the absolute value of the dynamic void coefficient is large), ΔMCPR of the pressure rise transient exceeds ΔMCPR of the water-supply transient. That is, when the dynamic void coefficient is increased (i.e. an absolute value is decreased), ΔMCPR for both transients can be decreased.

In this embodiment, the ΔMCPR of the pressure transient is made completely below ΔMCPR of the water-supply transient by ensuring that the dynamic void coefficient under the above situations is larger than "−5¢". That is, an absolute value of the dynamic void coefficient is less than "5¢" (equivalent to a delayed neutron fraction being less than 5%).

Therefore, the ΔMCPR and the reactor core stability are improved by making the dynamic void coefficient of the reactor core larger (i.e. the absolute value of the dynamic void coefficient small) than "−5¢".

The dynamic void coefficient is defined according to the following equation.

$$\text{dynamic void coefficient} = \left(\frac{\text{void reactivity coefficient}}{\text{delayed neutron fraction}}\right) \cdot (\text{average void fraction})$$

The average void fraction is usually 0.4.

It is known that the delayed neutron fraction β is about 0.006 in a nuclear reactor using a uranium fuel.

Thus, a dynamic void coefficient of −5¢ is equivalent to about −0.07 (ratio of % Δk/k/% void) of the void reactivity coefficient.

Although the value of the void reactivity coefficient changes depending on the state of the reactor core, the void reactivity coefficient in the reactor core of first loading is −0.03% Δk/k/% void, which is about half of the void reactivity coefficient under normal operation. Therefore, setting the dynamic void coefficient larger than −5¢ is the same as the void reactivity coefficient satisfying the following formula:

−0.07% Δk/k/% void ratio ≦ the void reactivity coefficient ≦ −0.03% Δk/k/% void ratio.

Here, the delayed neutron and delayed neutron fraction are explained.

It takes time until a neutron is generated after nuclear fission happens. A neutron generated some time after a fission reaction is called a delayed neutron. The delayed neutron fraction β represents the ratio of the number of delayed neutrons and the whole number of generating neutrons which are generated in nuclear fission.

In the first embodiment, the width of the by-pass portion is increased and the absolute value of the dynamic void coefficient is reduced to ensure that the void reactivity coefficient is set within the above mentioned range, to promote a slowdown of the neutrons. That is, the absolute value of the dynamic void coefficient becomes small by softening the neutron spectrum.

If the value of the width of the by-pass portion divided by the width of the channel box is 0.12 or more, since a sufficient neutron slowdown effect will be obtained, the dynamic void coefficient can be made larger (i.e. the absolute value of the dynamic void coefficient small) than or equal to −5¢.

Figure 2:
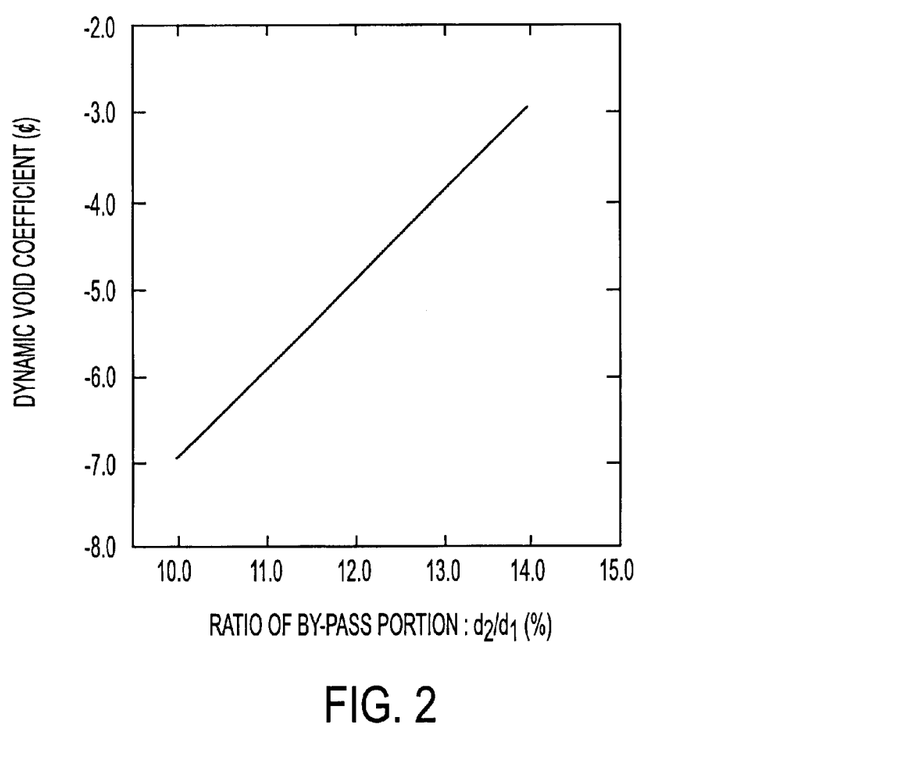
FIG. 2 shows correlation with the ratio of a width of a by-pass to a channel box width of a fuel assembly, and a dynamic void coefficient.

The width of the by-pass portion will be further explained referring to FIG. 2. In this embodiment, since the dynamic void coefficient is adjusted by the width of the by-pass portion, the core of the fuel assembly does not need to be changed. Furthermore, the structure of the fuel assembly does not need to be changed.

FIG. 2 is a graph showing the correlation between the ratio (namely, value of d2/d1) of the width d2 of the by-pass portion 7 to the width d1 of the channel box 4 of a fuel assembly (similar to the one shown in FIG. 13), and dynamic void coefficient. According to FIG. 2, when the ratio is 12% or more, it turns out that the dynamic void coefficient is −5¢ or more.

Therefore, proper selection of the width d2 of the by-pass portion 7 with respect to the width d1 of the channel box 4 of the fuel assembly, in this embodiment, make the dynamic void coefficient larger than −5¢.

This means that d2/d1>=0.12 is required.

Since d2/d1<=0.10 in the conventional nuclear reactor, when the same fuel assembly as the conventional nuclear reactor is used, in this embodiment the width of the by-pass portion is designed to be 20% or more larger than the conventional nuclear reactor.

By expanding the by-pass area, the reactivity at cold temperatures is reduced, and reactor shutdown margin is improved.

In this first embodiment, by setting up the width of the by-pass portion greater than the conventional nuclear reactor, the void coefficient can be adjusted in the suitable range. Therefore, the core of the fuel assembly and the channel box width do not need to be changed, and the performance of the natural circulation reactor is improved even though a fuel assembly which has the same structure as the conventional nuclear reactor is used.

Furthermore, in this embodiment, by expanding the by-pass area, the reactivity at cold temperatures is reduced, and shut down margin is improved.

The boiling water reactor of the second embodiment according to this invention is explained hereafter.

In this embodiment, like the first embodiment, the dynamic void coefficient during operating power is greater than –5¢ with a 40% average void fraction. As a result, pressure transient characteristics and in-core stability are improved.

In the first embodiment, the width of the by-pass portion between fuel assemblies is adjusted. In this embodiment, to replace the method of the first embodiment and to provide a dynamic void coefficient greater than –5¢, the axial enrichment distribution of the fuel assembly is adjusted.

Figure 3:
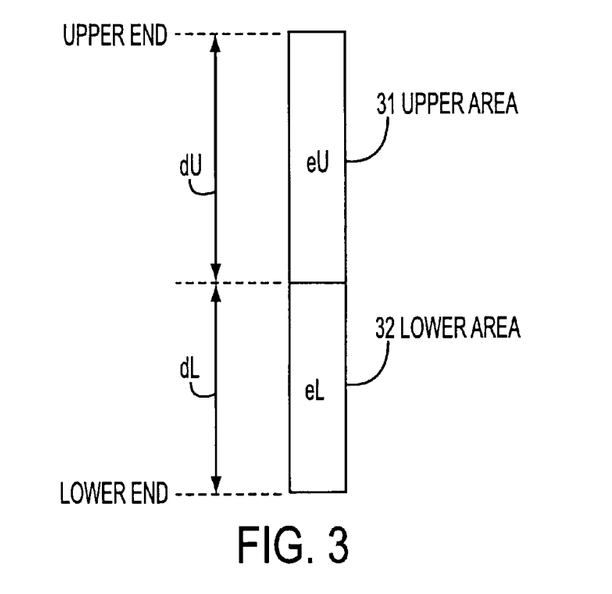
FIG. 3 shows an axial enrichment distribution of a fuel effective section of a fuel assembly of a second embodiment according to this invention.

FIG. 3 shows the axial enrichment distribution of a fuel effective section of a fuel assembly in this embodiment. As shown in FIG. 3, the fuel effective section of the fuel assembly is divided into two vertical areas in which the enrichment of uranium 235 differs. A symbol 31 shows an upper area and a symbol 32 shows a lower area. The axial length of the upper area 31 and the lower area 32 are expressed as dU, dL in FIG. 3, respectively. Moreover, the enrichment of uranium 235 is expressed as eU, eL, respectively.

In this embodiment, the enrichment of the upper area is 0.3 wt % higher than the enrichment of the lower area. Thereby, the peak position of axial power is contained in the upper area.

Furthermore, in consideration of the peak position, the axial length of the lower area 32 is within the limits of one-third to one-half of the fuel effective section full length.

That is, $1/3 <= dL/(dL+dU) <= 1/2$.

Generally, a boiling water nuclear reactor has the property that the void fraction increases toward the upper part at the time of output operating power. Therefore, a neutron slowdown is achieved in the lower part and power also tends to become large.

Therefore, power in the upper part can be gradually increased by increasing the upper enrichment from the lower part. Moreover, if the difference between the enrichment in the upper part and the enrichment in the lower part is 0.3 wt % or more, the power of the reactor core can always maintain a peak in the upper part during operating power.

The average void fraction of a reactor core with a power peak always in the upper part becomes smaller than the average void fraction of a reactor core which has a power peak in the lower part.

Because the absolute value of the dynamic void coefficient becomes small in accordance with the reduction of the average void fraction, substantially the same effect as making the absolute value of the dynamic void coefficient small as in the first embodiment can be obtained. In a nuclear reactor core loaded with fuel which has the above-mentioned structure, the peak position of the axial power is in the upper area of the fuel effective section. Therefore, the same effect as having made the average void fraction of the reactor core low, and having made the absolute value of the dynamic void coefficient substantially small, is obtained. Consequently, in-core stability during a pressure rise transient are further improved.

Moreover, in this embodiment, by decreasing the average void fraction, the pressure loss of the reactor core is reduced and the natural circulating flow rate increases in accordance with decreasing the average void fraction. Furthermore, ΔMCPR improves.

As noted above, in the fuel assembly loaded in the conventional nuclear reactor, the difference between the enrichment in the upper part and the enrichment in the lower part is about 0.2 wt % or less. When the enrichment of the reactor core upper area is increased such that the enrichment difference exceeds 0.2 wt %, when a "shutdown" occurs, there is not a comfortable margin of safety. On the other hand, in this embodiment, the absolute value of the dynamic void coefficient is made 5¢ or less. Since the reactor shut down margin has been sharply improved by setting the absolute value to be 5¢ or less, this allows making the enrichment difference more than 0.3 wt %.

Although FIG. 3 shows two different types of enrichment, the invention is not limited to two different types. Even if three or more kinds of enrichments are used, the same action and same effect as above are obtained by making the difference between a maximum enrichment of an upper area, and a minimum enrichment of a lower area more than 0.3 wt %.

The boiling water reactor of a third embodiment according to this invention is explained hereafter.

In this embodiment, a dynamic void coefficient is obtained similar to the first two embodiments, greater than –5¢ with a 40% average void fraction during power operation. In the second embodiment, the enrichment distribution in the vertical direction of the fuel effective section of the fuel assembly is adjusted. In this embodiment, the enrichment distribution at the vertical ends in the axial direction of the fuel assembly is designed to replace the second embodiment and to provide a dynamic void coefficient greater than –5¢.

Figure 4:
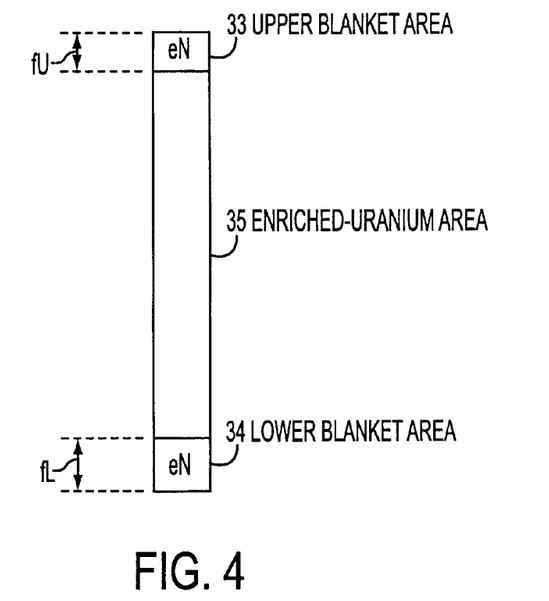
FIG. 4 shows an axial distribution of a blanket area of a fuel assembly of a third embodiment according to this invention.

FIG. 4 shows the distribution of blanket areas of the vertical ends in the axial direction. As shown in FIG. 4, an upper blanket area 33 is located at a top edge of the fuel assembly and a lower blanket area 34 is located at a lower edge. These areas have a low enrichment eN which consists of natural uranium or depleted uranium. The axial length of the upper blanket area 33 and the lower blanket area 34 are expressed as fU, fL, respectively. The area inserted between these blanket areas 33 and 34 is the ordinary enriched-uranium area 35. In this embodiment, the length a of the lower blanket area 34 is greater than the length fU of the upper blanket area 33.

In the conventional boiling water nuclear reactor, the length of the lower blanket is less than the length of the upper blanket. By making the lower blanket area 34 relatively longer, the peak position of the axial power output will be in the upper part of the fuel assembly. Therefore, natural circulation flow will increase, the average void fraction becomes low, and the absolute value of the dynamic void coefficient is reduced.

Therefore, ΔMCPR of the pressure rise transient and a delay ratio of in-core stability are further improved. Furthermore, in this embodiment, since the average void fraction decreases, the pressure loss of the reactor core declines. Since natural-circulation flow rate increases in connection with the reduction of the reactor core pressure loss, ΔMCPR improves.

The boiling water reactor of a fourth embodiment according to this invention is explained hereafter.

In this embodiment, the dynamic void coefficient during rated (normal) power operation is the same as the first three embodiments, that is, greater than –5¢ and an average void fraction of 40%.

In the fourth embodiment, a water-rod is dispersed and arranged in two or more positions in the fuel assembly, in order to achieve the same effect as in the first embodiment and to obtain a dynamic void coefficient greater than "–5¢", even though the width of the by-pass portion between the fuel assemblies is not changed.

Figure 5:
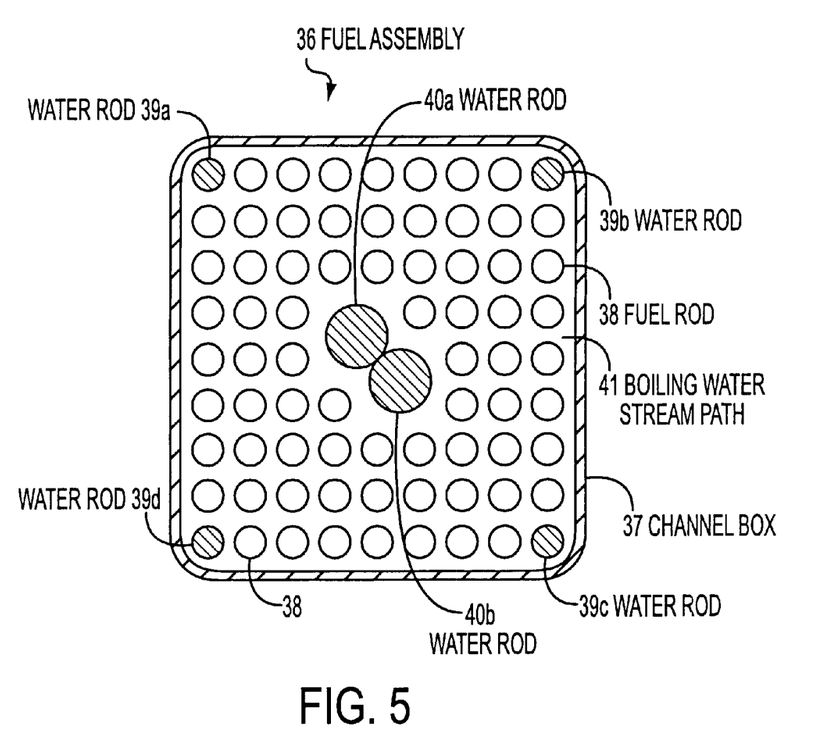
FIG. 5 is a sectional view showing an arrangement of a fuel rod and a water rod of a fourth embodiment according to this invention.

FIG. 5 is a sectional view showing the configuration of the fuel rods of the fuel assembly and the water-rods in this embodiment. As shown in FIG. 5, fuel assembly 36 bundles fuel rods 38 and six water-rods, and accommodates them in channel box 37 in a channel-shape. Boiling water stream path 41 is formed in this core. Two of the water-rods are water-rods 40a, 40b with a large diameter in the central section of the fuel assembly 36. Four other water-rods are provided as rods 39a, 39b, 39c, 39d arranged at four corner positions of the fuel assembly 36.

Configuring water-rods at four corner positions of the fuel assembly 36 has the same effect as expanding d2 in the first embodiment. The absolute value of the void coefficient decreases when the amount of coolant increases. In the first embodiment, the by-pass portion is expanded to decrease the absolute value of the dynamic void coefficient. In this embodiment, by arranging water rods in the corners of the fuel assembly (adjacent to the by-pass portion 7) the same effect is achieved.

Thus, a slowdown of neutrons can be promoted similar to expanding the width d2 of the by-pass portion 7. Therefore, like the first embodiment, the absolute value of the dynamic void coefficient can decrease, and ΔMCPR of the pressure rise transient and a delay ratio of the in-core stability can be further improved.

The magnitude of the cross-sectional area per one water-rod, the form, and the number of water-rods are not limited to the above-mentioned composition.

The boiling water reactor of a fifth embodiment according to this invention is explained hereafter.

In this embodiment, the dynamic void coefficient during rated operating power is like the dynamic void coefficient of the fourth embodiment, that is, greater than −5¢ based on an average void fraction of 40%.

In the fourth embodiment, four water-rods are arranged at four corner positions in the fuel assembly. The coolant (water) in these rods does not boil. But in this embodiment, the water-rods at four corner positions of this fuel assembly are eliminated, and the boiling water stream path is provided at the four corner positions.

Figure 6:
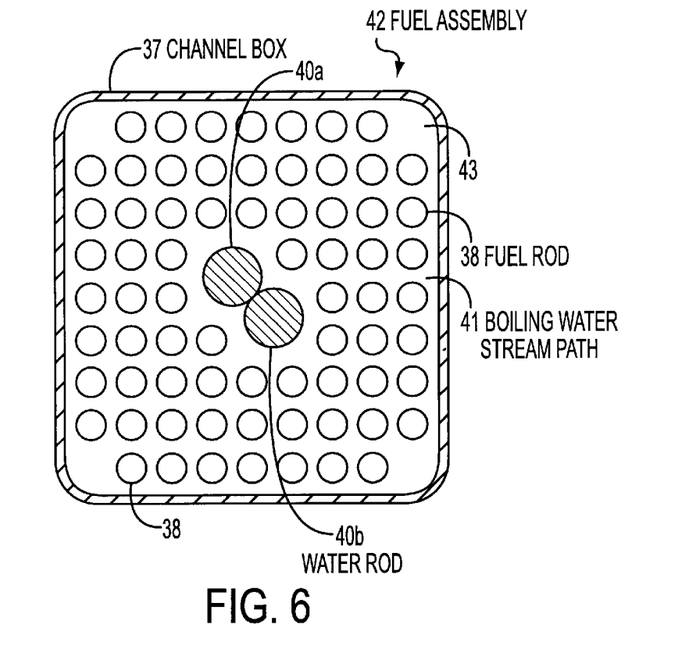
FIG. 6 is a sectional view showing an arrangement of a fuel rod and a water rod of a fifth embodiment according to this invention.

FIG. 6 is a sectional view showing the configuration of the fuel rods of the fuel assembly and the water-rods in this embodiment. As shown in FIG. 6, the fuel assembly 42 bundles two water-rods with a large diameter 40a and 40b located in the central part of the fuel assembly, and accommodates them in the channel box 37 having a channel-shape. The boiling water stream path 41 is formed.

An area (symbol 43) where a fuel rod or a water-rod is not arranged is provided at the four corner positions of the fuel assembly 42. Thus, a fuel rod (of FIG. 13) is transposed to a moderator by deleting the fuel rods arranged at the four corner positions of the fuel assembly.

Therefore, the same effect as in the first embodiment, where the width d2 of the by-pass portion 7 which serves as the coolant (i.e. non-boiling water) passage between the fuel assemblies, is achieved in this embodiment.

Thus, like the fourth embodiment, the absolute value of the dynamic void coefficient is decreased, and as a result, the properties and the core stability during a pressure rise transient can be further improved. Furthermore, in this embodiment, the radius in the four vertex sections of the channel box can be enlarged as compared with the fuel assembly 36, or the conventional fuel assembly. That is, as compared with FIG. 5, four corner positions of the channel box 37 can be made roundish in FIG. 6. This reduces stress in such a channel box, and the thickness of the channel box 37 can be reduced. Furthermore, there is the advantage that the area of water is increased and the dynamic void coefficient is increased.

The boiling water reactor of the sixth embodiment according to this invention is explained hereafter.

In this embodiment, a mechanism involving a safety relief valve installed in the main steam pipe of the nuclear reactor is used.

Figure 7:
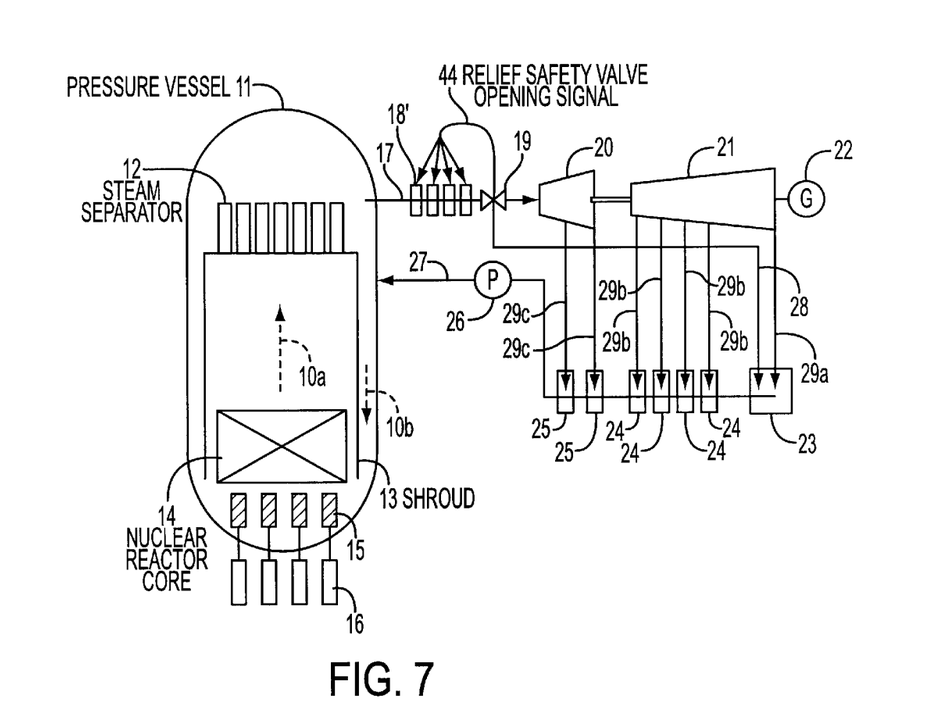
FIG. 7 shows an outline of a boiling water reactor of a sixth embodiment according to this invention.

FIG. 7 shows the outline of such a boiling water reactor of this embodiment. For components of the same composition as in the conventional boiling water reactor, the same symbol as in FIG. 14 is used and additional explanation thereof is omitted.

A relief safety valve 18' and a turbine governor valve 19 are connected to the main steam pipe 17 connected to the pressure vessel 11. Usually, the relief safety valve 18 is in a closed state during operating power. Therefore, the steam is led to a high-pressure turbine 20 through main steam pipe 17 and turbine governor valve 19.

A pressure rise transient occurs in a boiling water reactor, when turbine governor valve 19 is closed. In this embodiment, when the turbine governor valve 19 is closed, a relief safety valve opening signal 44 is inputted to at least one of the relief safety valves 18.

By the input of the relief safety valve opening signal 44, the relief safety valve 18 is released, and the pressure in the pressure vessel will decline quickly. Therefore, since the increase in pressure in the pressure vessel at the time of a pressure rise transient can be controlled, ΔMCPR is further improved with this action.

The boiling water reactor of the seventh embodiment according to this invention is explained hereafter.

In the sixth embodiment, an opening mechanism for the relief safety vale is employed. In this embodiment, equipment for forced circulation is provided and a part of total reactor core flow is provided by forced circulation.

Figure 8:
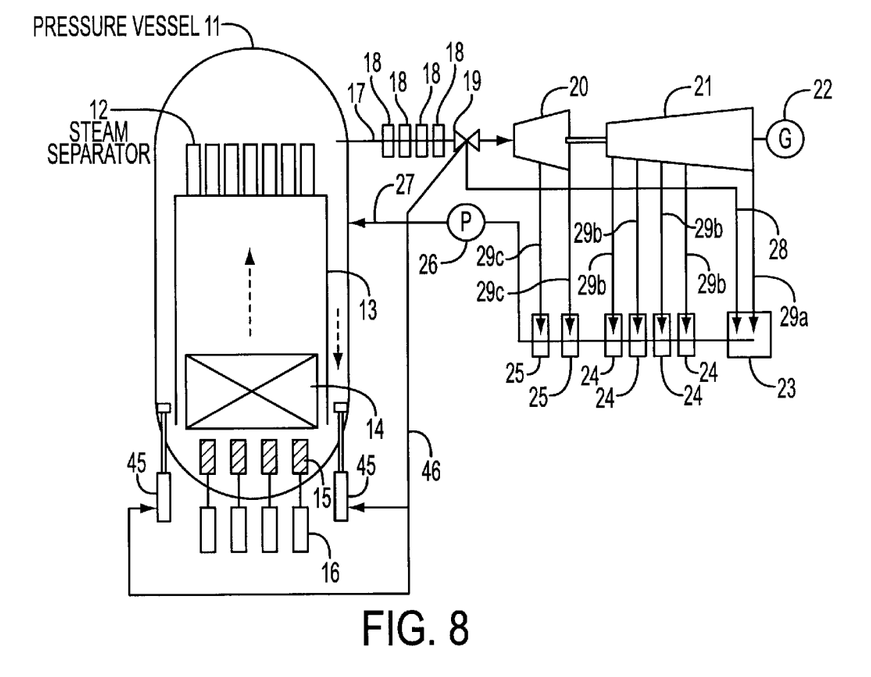
FIG. 8 shows an outline of a boiling water reactor of a seventh embodiment according to this invention.

FIG. 8 shows the outline of such a boiling water reactor in this embodiment. For components of the same structure as in the conventional boiling water reactor of FIG. 14, the same symbol is used and additional explanation thereof is omitted. Hereinafter, only different parts are explained.

In this embodiment, a circulating water-pump 45 is installed outside of the shroud 13 in the pressure vessel 11. A part of reactor core flow circulates by the circulating water pump 45 during operating power.

When a pressure rise transient occurs, the turbine governor valve closes, and the circulating water pump stops (i.e. "shuts down") due to a signal 46 inputted to the circulating water pump 45 from the valve. Even if the circulating water pump 45 stops, natural circulation maintains 70% or more of rated flow.

As mentioned, due to the circulating water pump 45 stopping (or being partially stopped), when a part of flow is decreased at the time of a pressure rise transient, nuclear reactor power output will decline in a short time, and ΔMCPR is further improved.

In addition, according to this embodiment, since a part of reactor core flow is controllable by the forced circulation of the circulating water pump 45, power operation following the load on the power plant can be performed.

When the circulating water pump 45 stops, it becomes impossible to ignore the temporary increase in ΔMCPR by the flow transient. ΔMCPR will increase significantly if the total forced flow ratio is larger than 30%. Therefore, in this embodiment, the forced-circulation flow rate is less than or equal to about 30% of total flow. Thus, even if the circulating water pump 45 stops, the system is designed such that 70% or more of the rated flow rate is maintained by natural circulation. The value of ΔMCPR due to the reactor core flow ratio transient is thus always maintained smaller than ΔMCPR due to the water-supply transient. Therefore, the reactor core flow ratio transient does not need to be taken into consideration in this embodiment, and ΔMCPR does not get worse due to the reactor core flow ratio transient, like the conventional forced-circulation water reactor.

The boiling water reactor of an eighth embodiment according to this invention is explained hereafter.

Figure 9:
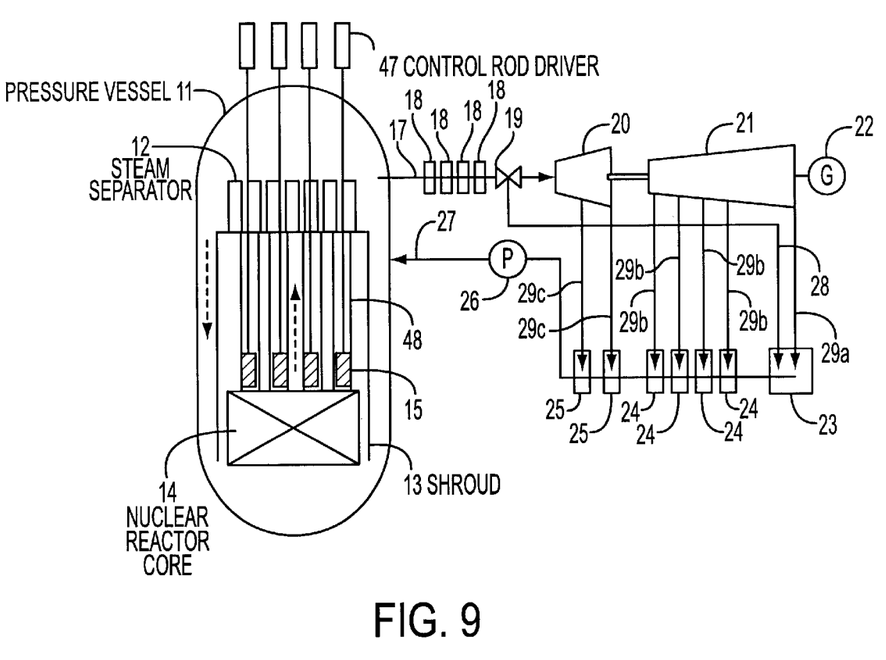
FIG. 9 shows an outline of a boiling water reactor of an eighth embodiment according to this invention.

In the sixth embodiment, an opening mechanism of a relief safety valve is employed. In this embodiment, a control rod drive which inserts a control rod from the upper part of the reactor core is formed in an upper part of the pressure vessel. FIG. 9 shows the outline of a boiling water reactor in this embodiment.

For components of the same composition as in the conventional boiling water reactor of FIG. 14, the same symbol is used and additional explanation thereof is omitted. Hereinafter, only different parts are explained.

In this embodiment, a control rod 15 is inserted from the upper part of reactor core 14, and a control rod drive 47 is connected with the control rod 15 and is installed above the upper part of the pressure vessel 11. A control rod guidance pipe 48 is provided to draw the control rod 15 from the reactor core 14 to the upper part of the shroud 13.

When a pressure rise transient occurs, the control rod 15 falls in the reactor core 14 due to gravity, and controls reactor core reactivity quickly. The faster the velocity of the insertion ("scram"), the faster the power rise increase can be controlled and ΔMCPR can be reduced further. Since gravity is used to insert the control rod 15, it is possible to perform reactivity control more rapidly than a system which inserts the control rod from the lower part, such as the one shown in FIG. 14.

Furthermore, by adopting the top insertion method, it is possible to bring the position of the reactor core 14 close to the lower part of the pressure vessel 11, and as a result the center of gravity of the reactor core can be lowered, and earthquake-proof resistance can be increased.

A boiling water reactor of the ninth embodiment according to this invention is explained hereafter.

Figure 10:
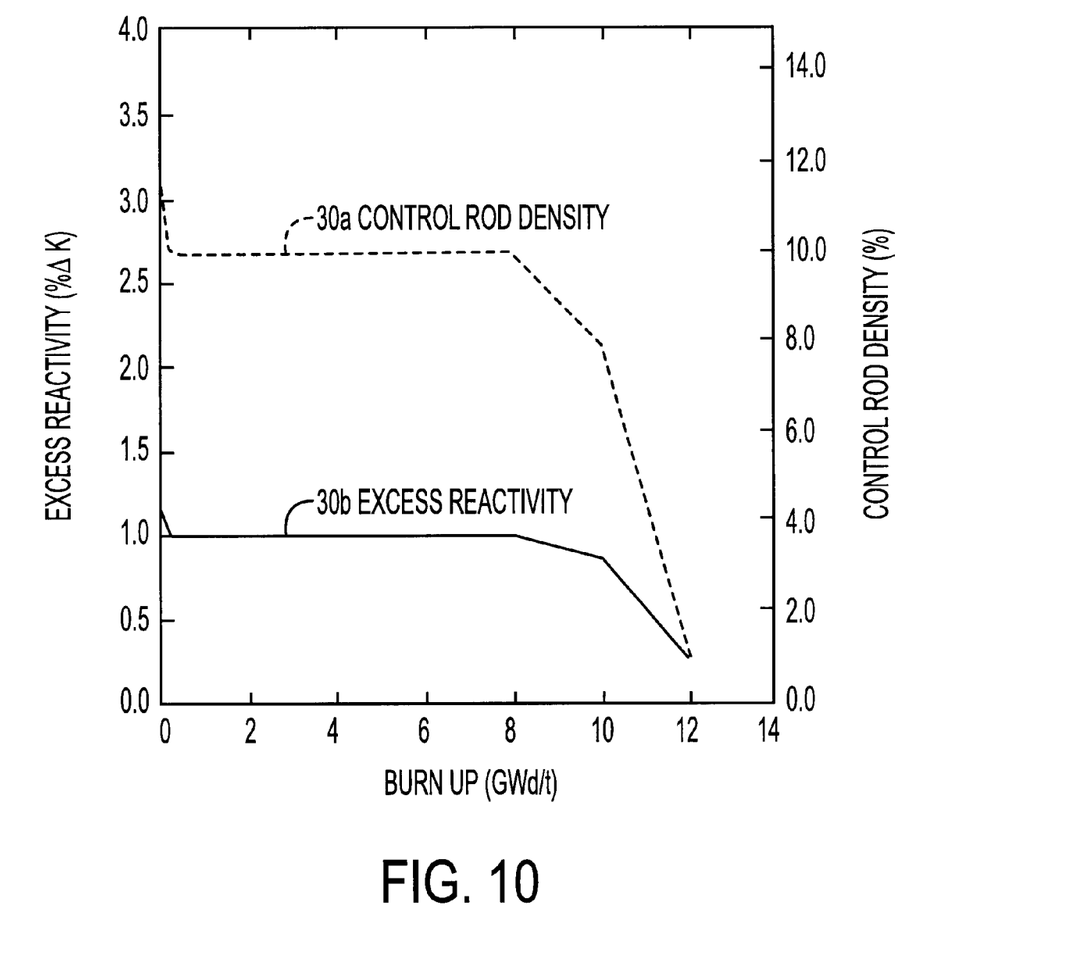
FIG. 10 is a graph which shows control rod density control of a boiling water reactor, and transition of surplus reactivity for a ninth embodiment according to this invention.

FIG. 10 is a graph which shows the progress of control rod density in this embodiment. Control rod density represents the portion of the number of control rod drives compared to the number of all control rod drives in core.

In this embodiment, the control rod density is shown by the dash line (symbol 30a in the FIGURE) as burn-up progresses. Selected insertion of a part of a control rod is employed so that control rod density may be changed by about 10% at early stages of power operation (about 8 GWd/t).

The control rods in the conventional nuclear reactor are taken all out in the last stage of the operating cycle. In this embodiment, in the last stage (about 8–12 GWd/t), although a few control rods are drawn out and control rod density is lowered from about 10% to about 1%, a state where the control rods are at least partially inserted is maintained.

The solid line (symbol 30b in the FIGURE) shows the change of the excess reactivity accompanied by the change of the control rod density. This excess reactivity curve shows the reactor core reactivity under the assumption that all control rods are temporarily withdrawn. When at least a part of a control rod is always inserted into the reactor core (and rapid insertion of all control rods can be achieved), as compared with the case where all control rods are withdrawn, the input of reactivity is attained in a short time. Furthermore, ΔMCPR is improved. In this embodiment, a change of the control rod density over the power operation cycle can be described as being a flat change. However, the same effect can be obtained not only by the above mentioned technique but also by a change which is not so flat.

Moreover, this effect can be obtained if the control rods are inserted from the reactor core upper part or from the reactor core lower part.

Figure 11:
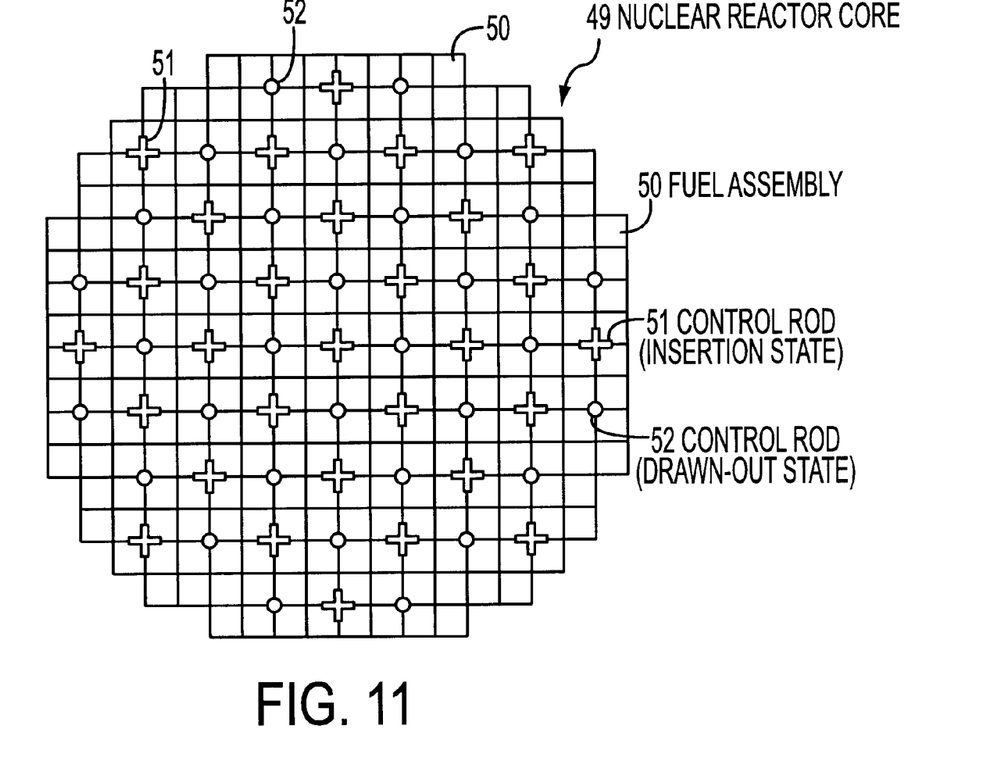
FIG. 11 is a sectional view showing a control rod insertion position of a reactor core of a boiling water reactor of the ninth embodiment according to this invention.

FIG. 11 is a sectional view showing the insertion position of the control rods of the reactor core in the last stage in this embodiment. This nuclear reactor core 49 shows one example where the fuel assembly 50 has 276 units.

The symbol 52 represents a drawn-out state of a control rod and the symbol 51 represents an insertion state in the last stage of the operating cycle. In the last stage, 29 control rods among 61 control rods are inserted.

Figure 12:
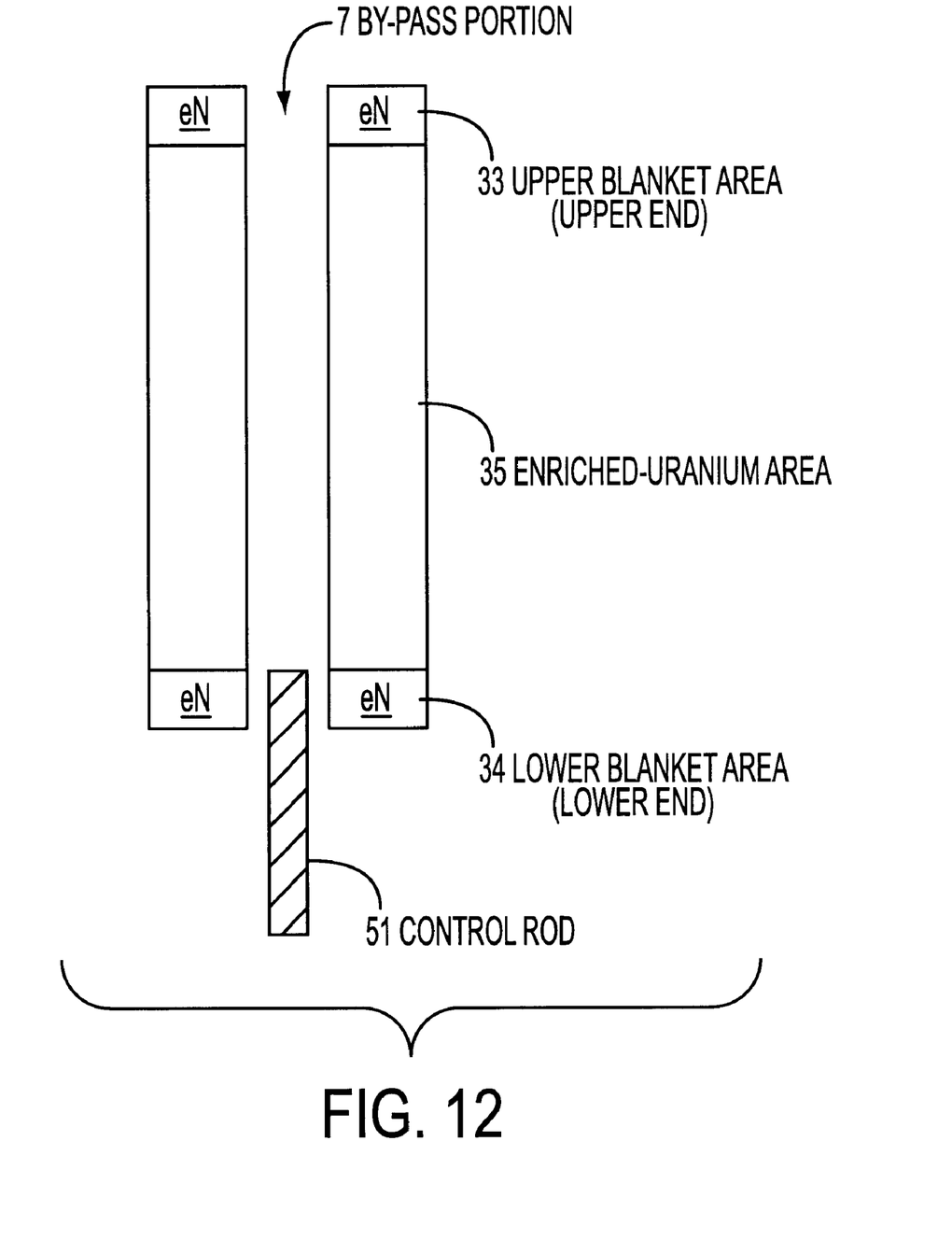
FIG. 12 shows a section of a fuel assembly.

FIG. 12 is a cross-section of the reactor core showing an example of the insertion state in the last stage of the operating cycle for a control rod 51. Here, a fuel assembly having the natural uranium blanket 34 is used at least for the lower edge. The embodiment of a fuel assembly having the natural uranium blanket areas 33 and 34 at both axial vertical edges is explained in connection with the third embodiment according to this invention and is also shown in FIG. 12. In this embodiment, the control rod 51 is inserted only to the lower blanket area 34 in the last stage of the operating cycle. FIG. 12 shows the situation where the maximum insertion is achieved, that is, it shows the embodiment where the control rod 51 is inserted to the upper edge of the lower blanket area 34. The length of the lower blanket area 34 is, for example, 3/24 of the fuel effective section full length, and control rod density becomes about 5% when 29 control rods 51 (shown in FIG. 11) are inserted to the position of FIG. 12. Thus, the decline of reactor core reactivity can be minimized by inserting the control rods only in the blanket area of natural uranium in the lower part of the fuel assembly.

Moreover, due to this insertion technique, since the reactivity can be controlled in a short time as compared with the case where all control rods are drawn out (like the conventional nuclear reactor), ΔMCPR is further improved. Simultaneous rapid insertion of all the control rods during a scram is achieved by maintaining a state where a portion of the control rods are always inserted into the reactor core from the early stage to the last stage.

In addition, in the above technique, although a change of the control rod density during operating power is completely flat as shown in FIG. 10, even if the density is not so flat, the same effect is ascertained. Moreover, the above-mentioned effect is the same even if the insertion direction of a control rod is from the reactor core lower or upper parts.

The sixth to ninth embodiments may be used in a reactor having a dynamic void coefficient during rated operating power of greater than −5¢ with an average void fraction of 40%, or with other reactors.

According to this invention, ΔMCPR during transients is minimized and the power density of the nuclear reactor is increased by reducing the delay ratio of the in-core stability. For these reasons, an economical natural circulation reactor (or a nuclear reactor using only partial forced-circulation) is achieved.

The invention is, of course, not limited to the particular embodiments described above. Numerous variations and modifications of the above-described embodiments exist. One or more of the embodiments can be combined together. Accordingly, the invention is defined by the following claims.

Japanese Priority Application Nos. PH10-241601, filed on Aug. 27, 1998, and PH11-181241, filed Jun. 28, 1999, including the specifications, drawings, claims and abstracts, are hereby incorporated by reference.

What is claimed is:

1. A boiling water reactor, comprising:

a coolant system; and a reactor core cooled by water circulated by said coolant system, wherein said coolant system and said reactor core are configured so as to cool said reactor core during rated power operation primarily by natural-circulation of said water and wherein said reactor core has a void reactivity coefficient more than −0.079% Δk/k/% void fraction and less than −0.03% Δk/k/% void fraction during rated power operation.

2. A boiling water reactor, comprising:

a pressure vessel;

a reactor core in said pressure vessel, and having a plurality of fuel assemblies; wherein a fuel assembly includes a plurality of fuel rods arranged with spaces between said fuel rods and a water-rod having a path for coolant, surrounded by a channel box; said reactor core having a by-pass portion for said coolant between said fuel assemblies; and wherein said reactor core is cooled by natural-circulation of water during rated power operation and has a void reactivity coefficient during rated power operation that is more than −0.07% Δk/k/% void fraction and is less than −0.03% Δk/k/% void fraction;

a main steam pipe for carrying steam generated in said pressure vessel by said reactor core; and a turbine for performing expansion work with said steam.

3. A boiling water reactor according to claim 2, wherein a fuel rod includes uranium 235 and uranium 238, and is divided into a plurality of parts in which enrichment of uranium 235 differs in a vertical direction, and wherein an enrichment difference between said parts is more than 0.3 wt % of uranium 235.

4. A boiling water reactor according to claim 2, wherein a fuel rod includes uranium 235 and uranium 238, and is divided into a plurality of parts in which concentration of uranium 235 differs in a vertical direction, said fuel rod having an upper blanket area and a lower blanket area including at least one of natural uranium and depleted uranium, and having enriched uranium in between said upper blanket area and said lower blanket area, and wherein a length of said lower blanket area is longer than a length of said upper blanket area.

5. A boiling water reactor according to claim 2, wherein a fuel rod includes uranium 235 and uranium 238, and is divided into a plurality of parts in which enrichment of uranium 235 differs in a vertical direction, said fuel rod having a top area and a bottom area comprising a blanket area which includes at least one of natural uranium and depleted uranium.

6. A boiling water reactor according to claim 2, wherein a ratio of a width of said by-pass portion to a width of said channel box is greater than or equal to 12%.

7. A boiling water reactor according to claim 2, further comprising four water rods arranged at four corners in a fuel assembly.

8. A boiling water reactor according to claim 2, further comprising four boiling water stream spaces, the same size as a fuel rod, at four corners of a fuel assembly.

9. A boiling water reactor according to claim 2, further comprising:

a turbine governor valve controlling an amount of steam sent from said pressure vessel to said turbine; and a plurality of relief safety valves to reduce steam pressure of said steam, located upstream of said turbine governor valve, wherein at least one of said plurality of relief safety valves is opened upon receipt of a signal to close said turbine governor valve.

10. A boiling water reactor according to claim 2, further comprising:

a circulating pump for making coolant circulate in said pressure vessel.

11. A boiling water reactor according to claim 10, wherein a flow rate due to natural circulation when said circulating pump stops is at least 70% of total flow rate.

12. A boiling water reactor according to claim 10, further comprising a circuit to stop said circulating pump when a turbine governor valve is closed.

13. A boiling water reactor according to claim 2, further comprising:

a control rod to be inserted into said by-pass portion;

a control rod guide to guide said control rod when said control rod is inserted into said by-pass portion; and a control rod drive to insert said control rod into a lower part of said pressure vessel from an upper part of said pressure vessel.

14. A method for operating a boiling water reactor, comprising:

a pressure vessel;

a reactor core in said pressure vessel, and having a plurality of fuel assemblies, at least one fuel assembly including a plurality of fuel rods arranged with spaces between said fuel rods, and a water-rod having a path for coolant, surrounded by a channel box; at least one fuel rod having a blanket area having at least one of natural uranium and depleted uranium in at least one of an upper part and a lower part of said fuel rod; said reactor core having a by-pass portion for said coolant between said fuel assemblies, and said reactor core being cooled by natural-circulation during rated power operations;

a control rod to be inserted into said by-pass portion;

a control rod guide to guide said control rod when said control rod is inserted into said by-pass portion;

a control rod drive to insert said control rod into a lower part of said pressure vessel from an upper part of said pressure vessel;

a main steam pipe for carrying steam generated in said pressure vessel; and a turbine for performing expansion work with said steam, comprising the step of:

operating said boiling water reactor at or near rated power so as to maintain a void reactivity coefficient of −0.07% Δk/k/% void fraction≦void reactivity coefficient ≦−0.03% Δk/k/% void fraction.

15. A method according to claim 14, further comprising operating said boiling water reactor such that at least one control rod is inserted into said reactor core to a border position between a blanket area and an enriched area during a last stage of an operational cycle.

16. A boiling water reactor according to claim 13, wherein said boiling water reactor is operated such that at least one control rod is inserted into said reactor core into a border position between a blanket area and an enriched area during a last stage of an operational cycle.

* * * * *